United States Patent
Triscon

(10) Patent No.: US 8,977,857 B1
(45) Date of Patent: Mar. 10, 2015

(54) SYSTEM AND METHOD FOR GRANTING ACCESS TO PROTECTED INFORMATION ON A REMOTE SERVER

(71) Applicant: Google Inc., Mountain View, CA (US)

(72) Inventor: Oscar del Pozo Triscon, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/763,552

(22) Filed: Feb. 8, 2013

Related U.S. Application Data

(60) Provisional application No. 61/597,645, filed on Feb. 10, 2012.

(51) Int. Cl.
*H04L 29/06* (2006.01)
*H04L 9/32* (2006.01)
*H04L 9/08* (2006.01)

(52) U.S. Cl.
CPC ............... *H04L 9/3263* (2013.01); *H04L 9/08* (2013.01)
USPC ........... 713/172; 713/171; 713/173; 713/174; 713/175; 713/176; 726/27; 726/28; 726/29; 726/30

(58) Field of Classification Search
USPC ......................................... 713/172
See application file for complete search history.

(56) References Cited

U.S. PATENT DOCUMENTS 8,347,349 B1 * 1/2013 Wilson et al. ..................... 726/1

* cited by examiner

*Primary Examiner* — Longbit Chai
(74) *Attorney, Agent, or Firm* — Morgan, Lewis & Bockius LLP

(57) ABSTRACT

A client device has one or more processors and memory. An application running on the device obtains a client certificate from a system service running on the device. The certificate includes a public key for the device. The device is authenticated to a remote server using the certificate. The application receives encrypted application identification information and an encrypted access token from the server. The application is authenticated to the device by comparing the received application identification information with corresponding application identification information from the application. The application invokes the system service to unencrypt the access token using the private key corresponding to the public key. The application sends a request for protected information to the server. The request includes the unencrypted access token. The application receives at least a portion of the protected information from the server, and stores the information in the memory on the device

18 Claims, 9 Drawing Sheets

Remote Server Data Structures

Client Devices 120

Application Identification Table 714

Protected Data 126

SYSTEM AND METHOD FOR GRANTING ACCESS TO PROTECTED INFORMATION ON A REMOTE SERVER

RELATED APPLICATIONS

This application claims priority to U.S. Provisional Patent Application 61/597,645, filed Feb. 10, 2012, entitled "System and Method for Granting Access to Protected Information on a Remote Server", which application is incorporated by reference herein in its entirety.

TECHNICAL FIELD

The disclosed implementations relate generally to retrieval of information from a remote server, and more specifically to methods for authenticating an application so that it can retrieve protected information.

BACKGROUND

Many software applications execute on client devices (such as a computer, a smart phone, or a television set top box), and rely on data that is stored on a remote server. The client device communicates with the remote server to retrieve the data it needs. In some cases, the data stored at the remote server is inherently valuable, possible because of the expense in collecting or developing the database. For example, the database maintained by GOOGLE MAPS is valuable.

When valuable information is maintained in this way, there is a possibility for a competitor to acquire the information and build a competing product without the expense of developing the database independently. Because individual client devices are able to connect to the remove server to utilize portions of the data, a rogue competitor may attempt to retrieve all of the data by using many individual client devices to retrieve small portions of the data.

In one scenario, a rogue competitor creates an alternative application (such as a game), that is downloaded by a large number of users. Unknown to the users, the alternative application contacts the remote server and obtains a portion of the data on behalf of the user, then sends the data to a server owned by the rogue competitor. The rogue application would be designed to request different (possibly overlapping) pieces of data for each user. By aggregating the data sent by each user, the rogue application facilitates building a copy of the valuable information.

One way to avoid the problem is to require each user to have an account, and login each time data is retrieved. A user of the hypothetical rogue application would discover the attempt to retrieve data, and thus prevent the intended retrieval of information from the remote server. However, in many cases it is impractical to require a user to be authenticated. For example, users of GOOGLE MAPS would not want to set up a separate account and log in each time they wanted to use a map. Furthermore, some operating systems (such as the ANDROID operating system) specifically allow applications to use stored credentials, so a user might not discover an illicit use of the user's credentials.

What is needed is a method that allows individual users to access protected data on a remote server, does not require user input to authenticate the user or the user's device, and prevents a rogue application from impersonating the legitimate application.

SUMMARY OF THE INVENTION

Disclosed implementations enable access to protected data on a server using a two stage authentication process that does not require user input. In the first stage, the client device itself is authenticated. At this point the server can "trust" the operating system of the client device. In the second stage, the operating system on the client device authenticates an application using encrypted information retrieved from the remote server. The server has specific application identification information (e.g., name, creator, permissions, etc.), and sends the encrypted application identification information to the operating system on the client device. The operating system is then able to authenticate the application by comparing what the application information is supposed to be with the actual application identification information from the application on the client device. When the application is authenticated, it receives a token, which allows the application to request protected information from the remote server.

One reason this process works is that the operating system maintains a client certificate, with a public key/private key pair. The private key is not directly accessible by applications running on the client device, but can be utilized by encryption and decryption procedures.

In some implementations, a method of granting access to protected information stored at a remote server without authenticating a user is implemented on a client device with one or more processors and memory. An application running on the client device obtains a client certificate from a local system service running on the client device. The client certificate includes a public key for the client device. The client device is authenticated to a remote server using the client certificate. The application receives encrypted application identification information and an encrypted access token from the remote server. The application is authenticated to the client device by comparing the received encrypted application identification information with corresponding application identification information from the application. The application invokes the local system service to unencrypt the encrypted access token using the client private key corresponding to the client public key, thereby receiving an unencrypted access token. The application sends a request for a portion of the protected information to the remote server. The request includes the unencrypted access token. The application receives the requested portion of the protected information from the remote server, and stores the received protected information in the memory on the client device.

In some implementations, a computer system for granting access to protected information stored at a remote server without authenticating a user has memory, one or more processors, and one or more programs stored in the memory. The programs are configured for execution by the one or more processors. The one or more programs include instructions for obtaining a client certificate from a local system service running on the client device. The client certificate includes a public key for the client device. The programs also include instructions for authenticating the client device to a remote server using the client certificate. The programs include instructions for receiving encrypted application identification information and an encrypted access token from the remote server. The programs include instructions for authenticating the application to the client device by comparing the received encrypted application identification information with corresponding application identification information from the application. The programs also include instructions for invoking the local system service to unencrypt the encrypted access token using the client private key corresponding to the client public key, thereby receiving an unencrypted access token. The programs include instructions for sending a request for a portion of the protected information to the remote server. The request includes the unencrypted access token. The programs include instructions for receiving the requested portion of the protected information from the remote server, and for storing the received protected information in the memory on the client device.

In some implementations, a non-transitory computer readable storage medium stores one or more programs to be executed by a computer system. The one or more programs include instructions for obtaining a client certificate from a local system service running on a client device. The client certificate includes a public key for the client device. The programs also include instructions for authenticating the client device to a remote server using the client certificate. The programs include instructions for receiving encrypted application identification information and an encrypted access token from the remote server. The programs include instructions for authenticating the application to the client device by comparing the received encrypted application identification information with corresponding application identification information from the application. The programs also include instructions for invoking the local system service to unencrypt the encrypted access token using the client private key corresponding to the client public key, thereby receiving an unencrypted access token. The programs include instructions for sending a request for a portion of the protected information to the remote server. The request includes the unencrypted access token. The programs include instructions for receiving the requested portion of the protected information from the remote server, and for storing the received protected information in the memory on the client device.

BRIEF DESCRIPTION OF THE DRAWINGS

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the implementations.

Figure 1:
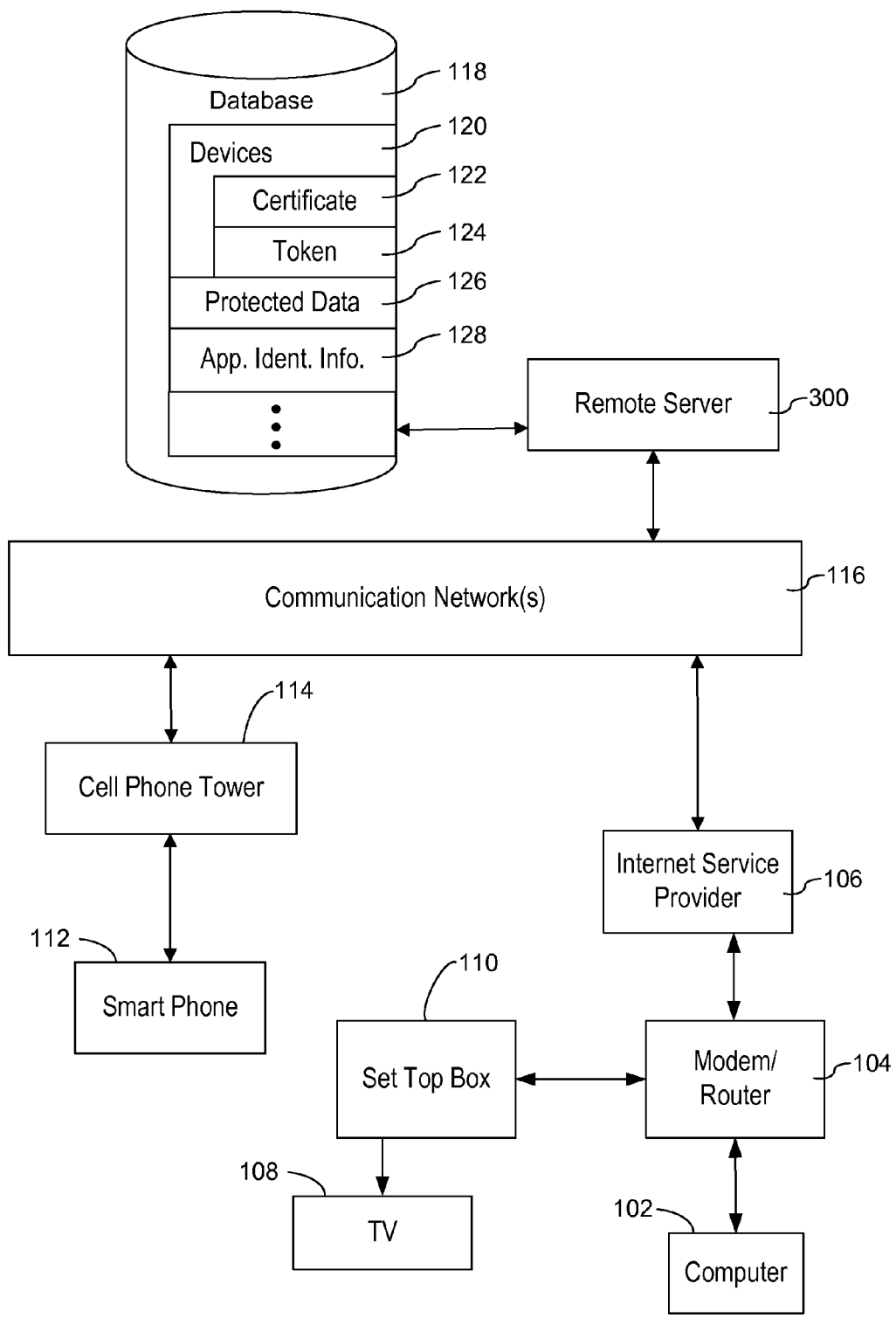
FIG. 1 is a block diagram of a system that grants access to protected information stored at a remote server without authenticating a user in accordance with some implementations.

FIG. 1 illustrates a system in which various client devices can communicate with a remote server 300 to retrieve portions of protected information 126. Three exemplary types of client devices 200 are illustrated in FIG. 1: a smart phone 112, a set top box 110, and a computer 102. A smart phone 112 is a client device 200 that connects to a communication network 116 using a cell phone tower 114 or other wireless access equipment. A set top box 110 is a client device 200 that uses a television 108 to display information, and connects to a communication network 116 through a modem and/or router 104 and an internet service provider 106. A computer 102 is a client device 200 that connects to a communication network 116 through a modem and/or router 104 and an internet service provider 106. A computer 102 can be a desktop computer, laptop computer, tablet computer, etc. Some computers 102 connect to the modem and/or router 104 using wireless technology, such as a wireless router or wires access point.

Each client device 200 communicates with the remote server 300 over one or more communication networks 116, such as the Internet. The remote server receives requests for authentication and access to protected data 126. In some implementations, the protected data is stored in a database 118 (e.g., a SQL database), but the protected data could also be stored on a file server. The database 118 (or file server) also stores other information, including information about the devices 120 which have received (or may receive) portions of the protected data. In some implementations, each device is identified by a client certificate 122. The client certificate 122 is a digital certificate, such as an X.509 certificate. The client certificate includes a client public key. In some implementations, the device data includes an access token 124. Whenever a client device requests a portion of the protected data 126, the client device sends a copy of the access token 124 to identify the requestor as an authenticated device. In some implementations, the database 118 or file server stores application identification information 128, which identifies the application that will be granted access to the protected information 126. The application identification information 128 can be the name of the application, the creator of the application, a unique ID generated specifically for the application, a set of permissions, etc., or a combination of such items. Some implementations use a unique digital certificate generated for the application by the application developer.

Figure 2:
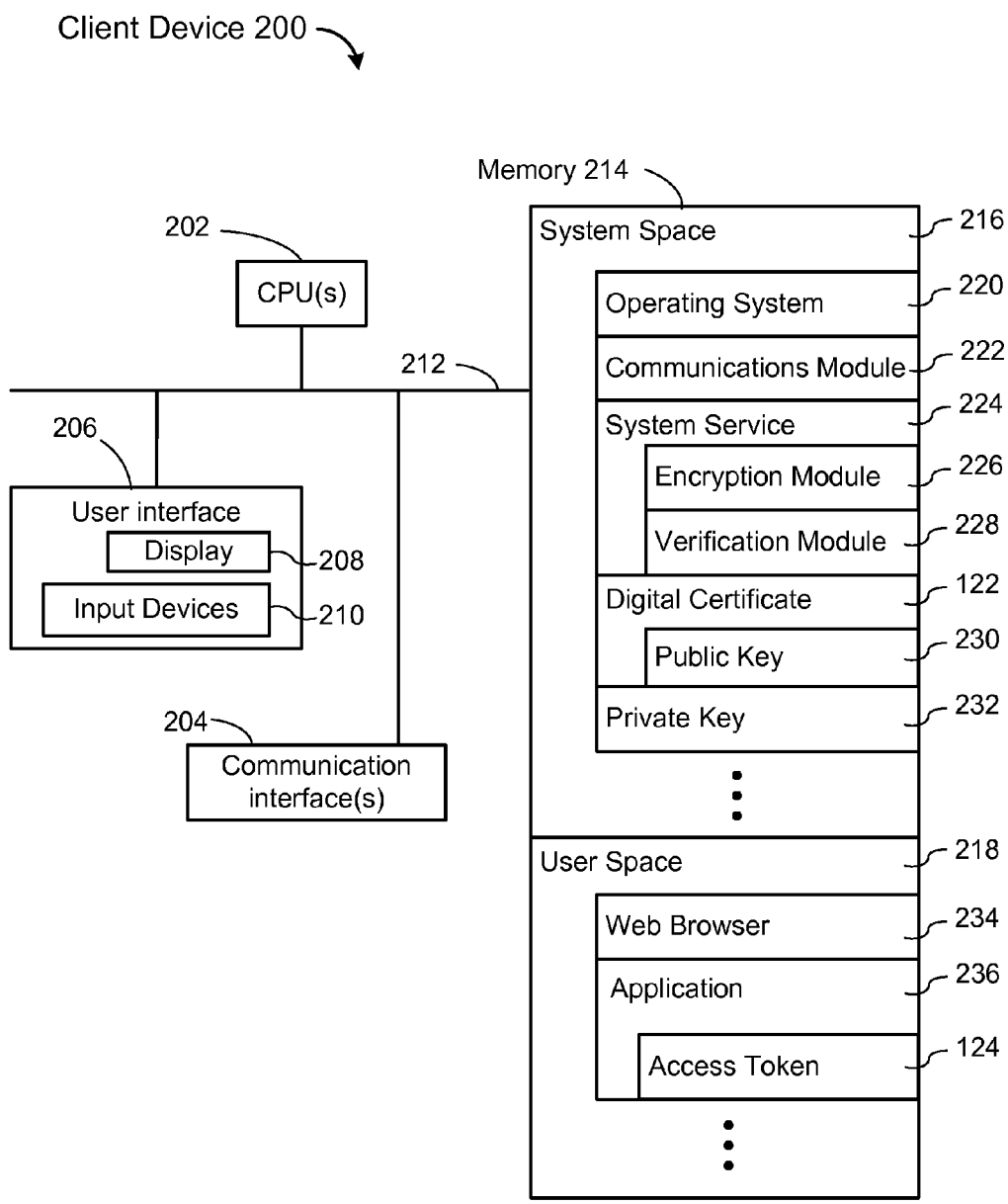
FIG. 2 is a functional block diagram of a client device in accordance with some implementations.

FIG. 2 illustrates a typical client device 200. As noted above, client devices include computes, set top boxes, and smart phones. A client device 200 generally includes one or more processing units (CPUs) 202, one or more network or other communications interfaces 204, memory 214, and one or more communication buses 212 for interconnecting these components. The communication buses 212 may include circuitry (sometimes called a chipset) that interconnects and controls communications between system components. A client device 200 includes a user interface 206, for instance a display 208 and one or more input devices 210, such as a keyboard and a mouse. Memory 214 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214 may include mass storage that is remotely located from the central processing unit(s) 202. Memory 214, or alternately the non-volatile memory device(s) within memory 214, comprises a computer readable storage medium. The memory 214 is partitioned into system space 216 and user space 218. The system space cannot be directly accessed by a user, and stores the core functionality of the device 200. The user space runs individual applications selected by a user. The system space provides a specific set of interfaces that can be accessed by applications in the user space.

In some implementations, the system space 216 in memory 214 or the computer readable storage medium of memory 214 stores the following programs, modules and data structures, or a subset thereof:
- an operating system 220 (e.g., ANDROID, WINDOWS or MAC OS X) that generally includes procedures for handling various basic system services and for performing hardware dependent tasks;
- a network communications module 222 that is used for connecting the client device 200 to servers or other computing devices via one or more communication networks, such as the Internet, other wide area networks, local area networks, metropolitan area networks, and the like;
- a system service module 224, which handles various cryptographic needs. The system service module 224 includes an encryption module 226, which can be invoked to encrypt files using a private key 232. In some implementations, the system service 224 includes a verification module 228 that can be invoked to verify the identity of an application 236 that runs in the user space 218. The system service 224 is described in more detail below with respect to FIG. 5.
- a digital certificate 122, which is used to authenticate the client device 200. The digital certificate 122 includes a public key 230. In some implementations, the public key 230 and private key 232 work as inverses of each other: a file that is encrypted with either can be decrypted by the other key. In some implementations, the public key 230 and private key 232 are RSA keys, and the encryption module 226 implements RSA encryption.

In some implementations, the user space 218 in memory 214 or the computer readable storage medium of memory 214 stores the following programs, modules and data structures, or a subset thereof:
- a web browser 234, which allows a user of the client device 200 to access web sites and other resources over the communication network; and
- one or more software applications 236, which may request information 126 from a remote server 300. In some implementations, a software application 236 uses an access token 124 when requesting information 126 from the remote server 300. The acquisition and usage of access tokens 124 is described in more detail below with respect to FIGS. 5 and 6.

Figure 3:
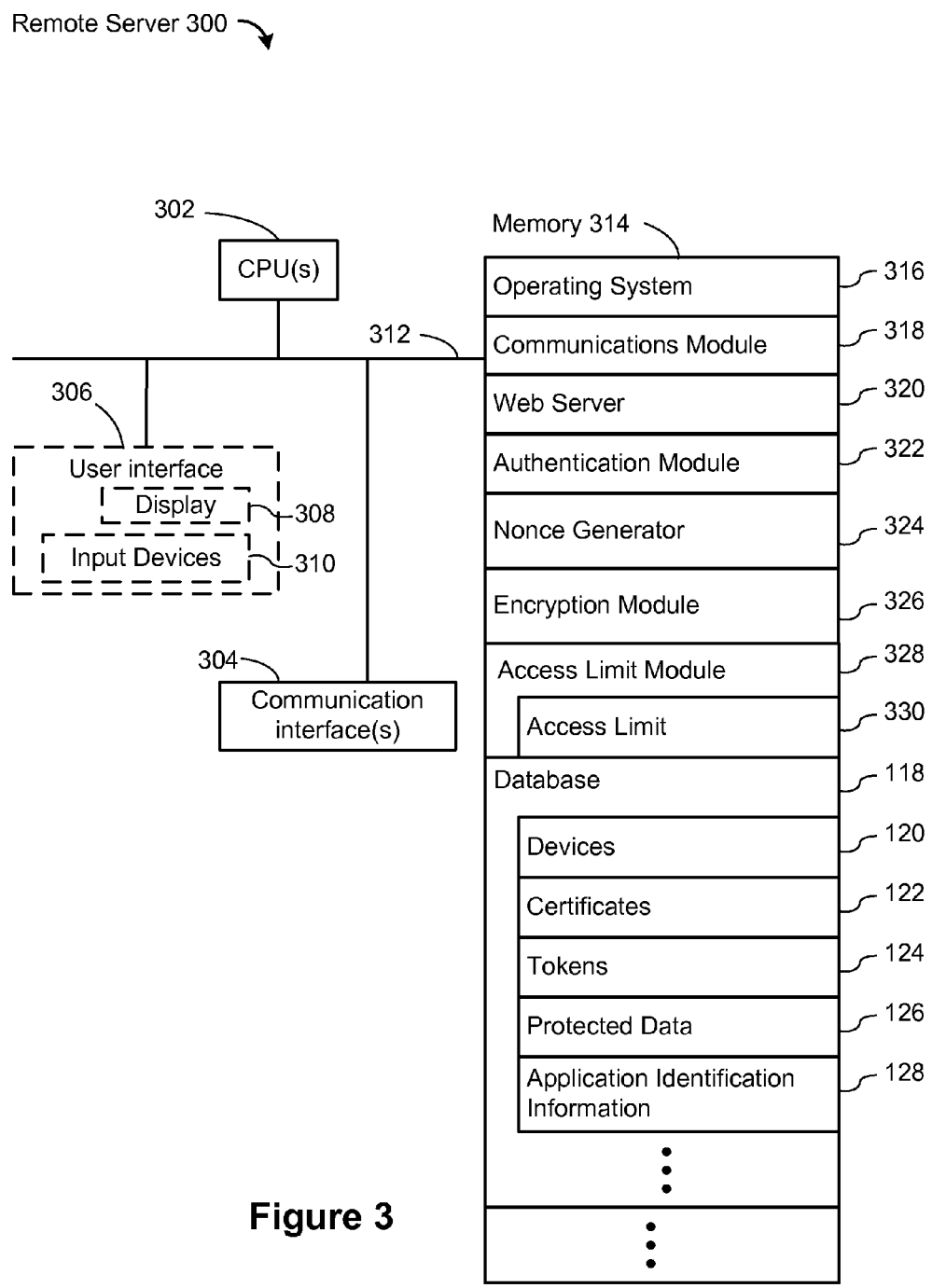
FIG. 3 is a functional block diagram of a remote server in accordance with some implementations.

Referring to FIG. 3, the remote server 300 generally includes one or more processing units (CPUs) 302, one or more network or other communications interfaces 304, memory 314, and one or more communication buses 312 for interconnecting these components. The communication buses 312 may include circuitry (sometimes called a chipset) that interconnects and controls communications between system components. The remote server 300 may optionally include a user interface 306, for instance a display 308 and a keyboard 310. Memory 314 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may include mass storage that is remotely located from the central processing unit(s) 302. Memory 314, or alternately the non-volatile memory device(s) within memory 314, comprises a computer readable storage medium. In some implementations, memory 314 or the computer readable storage medium of memory 314 stores the following programs, modules and data structures, or a subset thereof:
- an operating system 316 (e.g., Linux or Unix) that generally includes procedures for handling various basic system services and for performing hardware dependent tasks;
- a network communications module 318 that is used for connecting the log server 300 to servers or other computing devices via one or more communication networks, such as the Internet, other wide area networks, local area networks, metropolitan area networks, and the like;
- a web server 320, which receives requests from users for web pages or other resources such as web services, and delivers the requested web pages or other resources to the client devices 200 that issued the requests;
- an authentication module 322 that authenticates client devices 200 without requiring input from a human user. Exemplary processes are described n more detail below with respect to FIGS. 5 and 6;
- a nonce generator 324, which generates pseudo-random numbers for use in exemplary authentication processes;
- an encryption module 326, which can encrypt a source file using a specified encryption key. The source file may be text or binary data, and need not be saved to permanent storage (e.g., the source file may be just a string of data in memory). In some implementations, the encryption module implements RSA encryption;
- an access limit module 328, which limits the amount of protected data that an individual client device 200 may receive. An access limit 330 imposed by the access limit module 328 may limit the cumulative total amount of protected data 126 received, or may limit the amount of protected data received during a specified unit of time. In some implementations, both types of limits are applied;
- one or more databases 118, which store information. One type of information stored in the database 118 is information about client devices 120. In some implementations, the information about a client device 120 includes a client certificate 122, which uniquely identifies a specific client device. In some implementations, the database 118 stores access tokens 124 that have been issued for client devices. The database 118 also stores the protected data 126 that may be retrieved by the associated software application 236. In some implementations, the database 118 also stores certain application identification information 128, which is used to verify that only the authorized application 236 is granted access to the protected information 126. This is described in more detail below with respect to FIG. 5. Exemplary data structures are illustrated below in FIGS. 7A-7C.

Although FIG. 3 shows a remote server, FIG. 3 is intended more as functional descriptions of the various features which may be present in a set of servers than as a structural schematic of the implementations described herein. In practice, and as recognized by those of ordinary skill in the art, items shown separately could be combined and some items could be separated. For example, some items shown separately in FIG. 3 could be implemented on single server and single items could be implemented by one or more servers. The actual number of servers used to implement a remote server, and how features are allocated among them will vary from one implementation to another, and may depend in part on the amount of data traffic that the system must handle during peak usage periods as well as during average usage periods.

Each of the methods described herein may be performed by instructions that are stored in a computer readable storage medium and that are executed by one or more processors of one or more servers or clients. Each of the operations shown in FIGS. 1-3 may correspond to instructions stored in a computer memory or computer readable storage medium.

Figure 4:
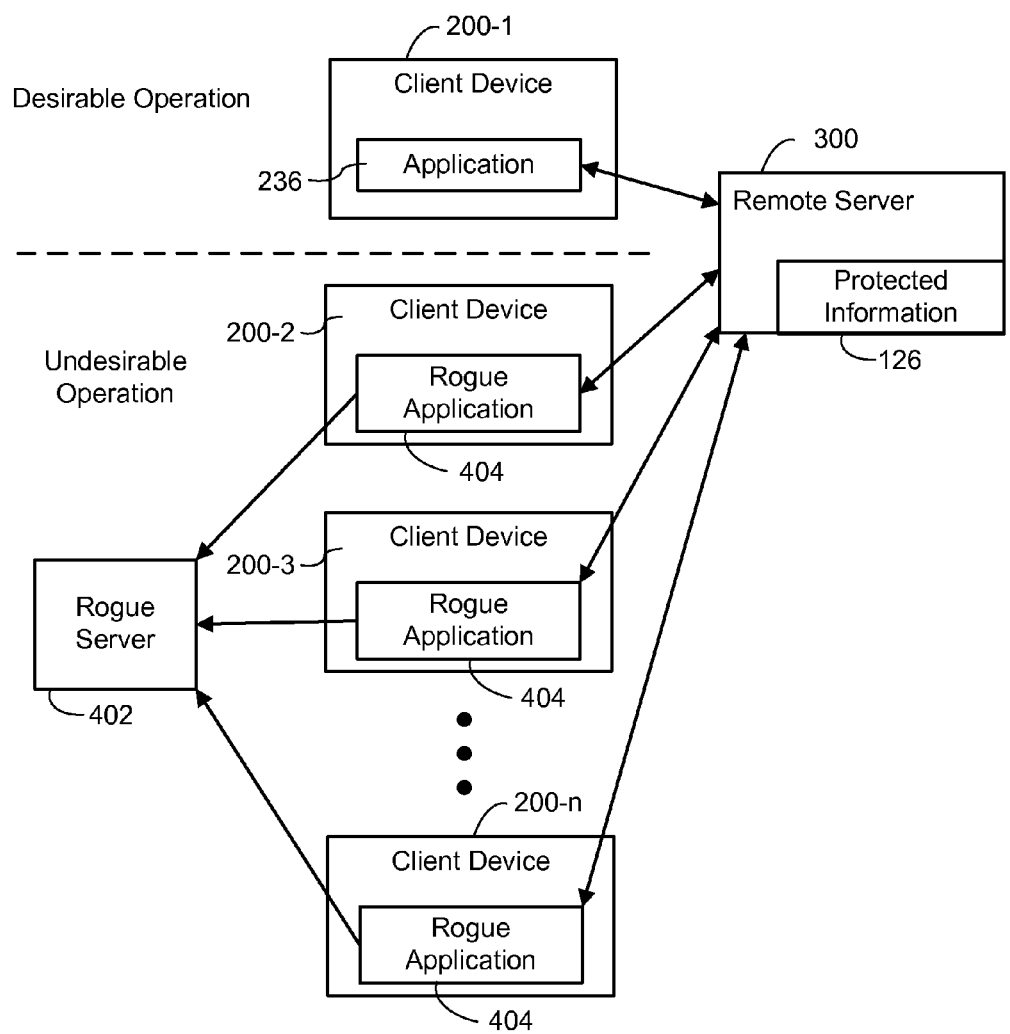
FIG. 4 is a functional block diagram illustrating normal operation as well as undesirable rogue operation that prevented in accordance with some implementations.

FIG. 4 illustrates both the desirable operation of an application and undesirable rogue operation. A remote server 300 maintains protected information 126 (generally in a database 118), and provides that information to an associated application 236 that runs on a client device 200-1. In this way, the application 236 can access the data that it needs, but the protected data 126 is centrally stored at the remote server.

In some cases, the protected information is particularly valuable, but could be easy for a rogue competitor to copy. The lower portion of FIG. 4 illustrates one way that a rogue competitor may attempt to acquire the protected data. In this undesirable scenario, individual client devices 200-2, 200-3, . . . , 200-n are executing a rogue application 404, which impersonates the actual application 236. Each of the rogue applications contacts the remote server 300 to acquire a portion of the protected data 126. Each of the rogue applications then forwards the protected data it collects to a rogue server 402, which aggregates the data in an attempt to build the complete protected data set 126. The illustrated rogue application in FIG. 4 does not require rogue client devices or complicit users. Ordinary users could download what appears to be a reasonable application to an authentic client device, but be unaware of what the rogue application is doing.

Disclosed implementations address this problem by authenticating the application that requests data from the remote server. This process is described in more detail in FIGS. 5, 6, 8A, and 8B below.

Figure 5:
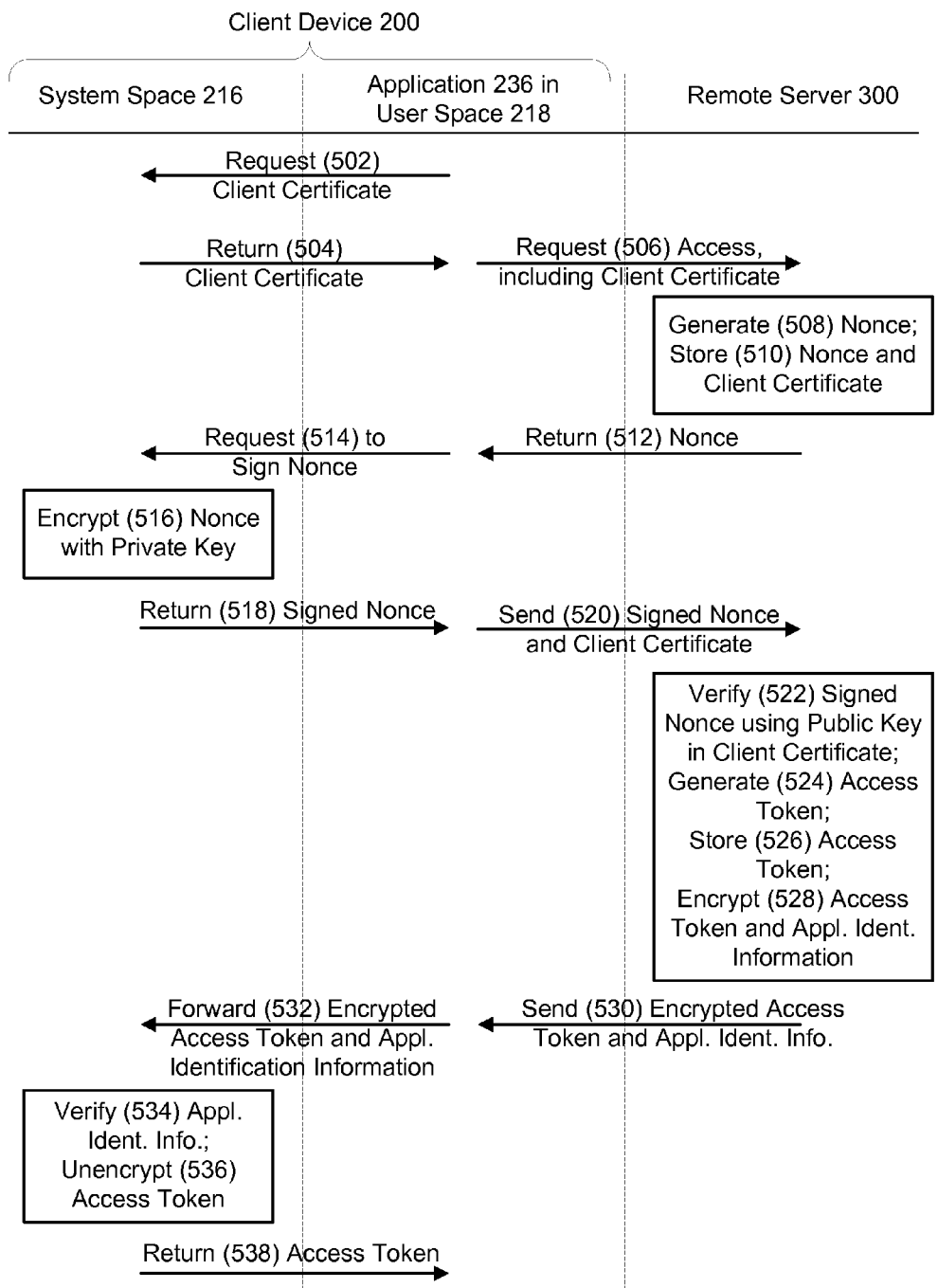
FIG. 5 is an exemplary process flow for acquiring an access token in accordance with some implementations.
Figure 6:
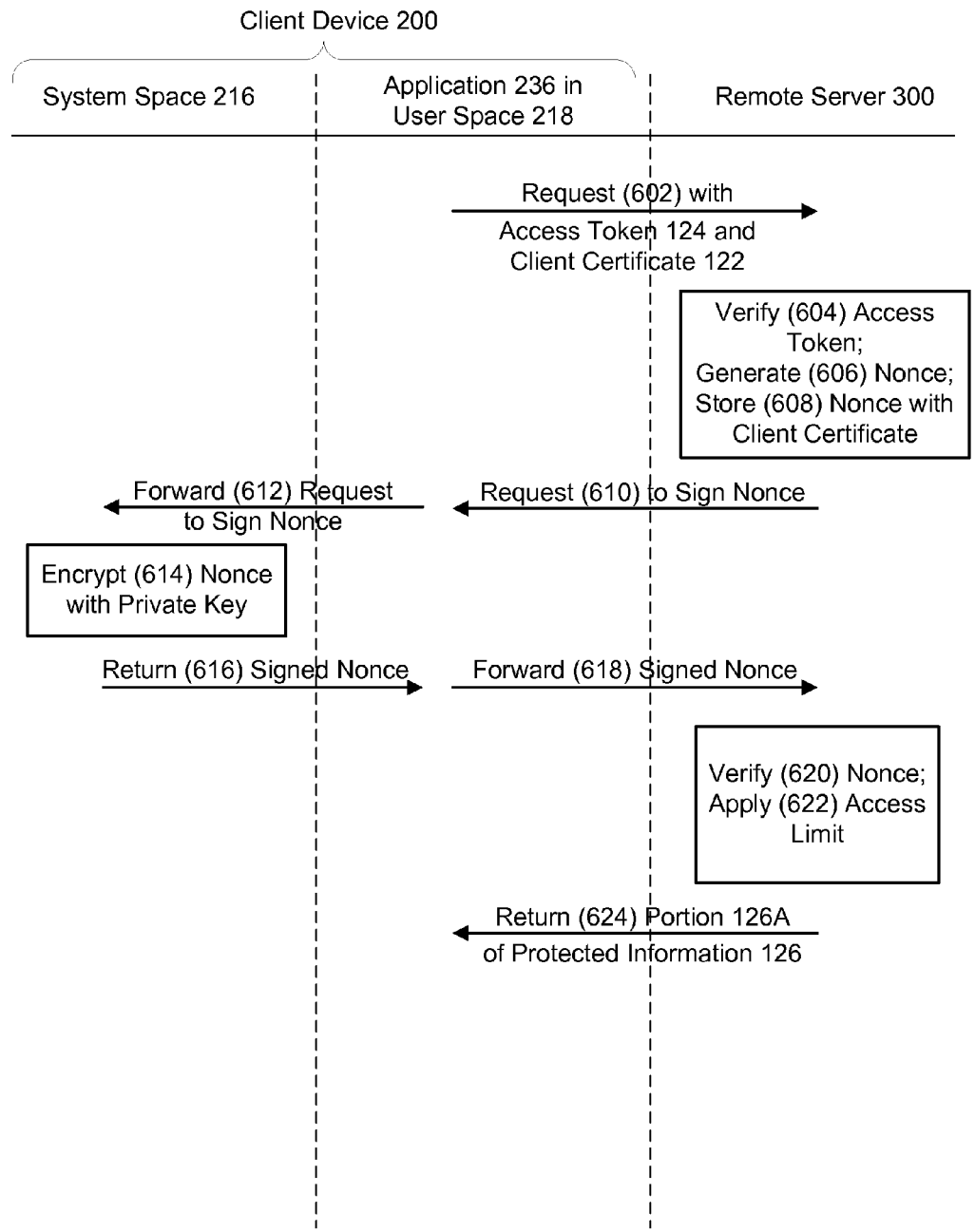
FIG. 6 is an exemplary process flow to retrieve protected information in accordance with some implementations.

FIGS. 5 and 6 illustrate exemplary processes for acquiring an access token and using an access token to retrieve a portion of the protected data 126 from the remote server 300. Each of these two figures is divided into three columns corresponding to the system space 216 of the client device 200, the application 236 running in the user space 218 of the client device 200, and the Remote server 300. Arrows from one column to another indicate communication between the two processes.

Figure 7A:
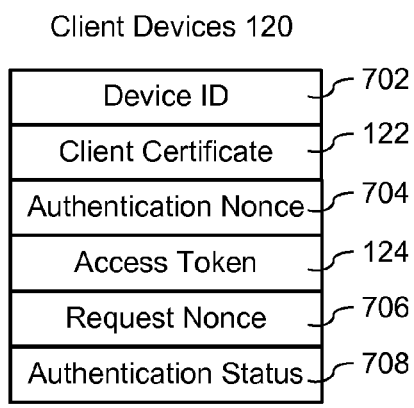
FIGS. 7A-7C illustrates exemplary data structures used by a remote server to grant access to protected information according to some implementations.

FIG. 5 illustrates a process for acquiring an access token from the remote server according to some implementations. The application 236 requests (502) the client certificate 122 from the system service 224. In response, the system service 224 returns (504) the client certificate 122 to the application 236. The application 236 then requests (506) access to the protected information 126, and includes the client certificate 122 in the request. In some implementations, the remote server 300 generates (508) a nonce 704—a pseudo-random number that is used one time. The remote server 300 stores (510) the nonce 704 and the client certificate 122 received from the application 236 in its memory 314. An exemplary data structure for this information is illustrated in FIG. 7A, and described below.

The remote server 300 sends (512) the nonce 704 to the application 236. In alternative implementations, the nonce 704 is encrypted using the client public key 230 (which is included in the client certificate 122) prior to sending it to the application 236. The application 236 forwards (514) the nonce 704 to the local system service 224. The encryption module 226 in the local system service 224 encrypts (516) the nonce 704 using the private key 232. Once encrypted, the local system service 224 returns (518) the encrypted nonce to the application 236. In the alternative implementation where the server 300 encrypts the nonce 704, the local system service 224 unencrypts the nonce 704 using the client private key 232.

The application 236 then sends (520) the signed (encrypted) nonce and the client certificate 122 to the remote server 300. The server 300 then verifies (522) the signed nonce using the public key 230 in the client certificate 122. Because only the client device 200 with the digital certificate 122 can encrypt data using the private key 232 corresponding to the digital certificate 122, this process has authenticated the client device. However, the application 236 running on the device 200 is not yet authenticated.

To authenticate the application 236, the server 300 generates (524) an access token 124, and stores (526) the access token 124 with the client certificate 122. This is illustrated in FIG. 7A. The server then encrypts (528) the access token 524 and stored application identification information 128 using the public key 230. In some implementations, the access token 524 and application identification information 128 are encrypted separately. In other implementations, the two pieces of data are combined and encrypted as a single unit. The server 300 sends (530) the encrypted access token 124 and encrypted application identification information 128 to the application 128. The application 236 forwards (532) the encrypted access token 124 and application identification information 128 to the verification module 228 in the local system service 224.

The verification module 228 first verifies (534) the application identification information 128 by comparing the actual information associated with the application to the encrypted application identification information 128 forwarded from the server 300. The comparison can be made by either by decrypting the encrypted application identification information 128, or encrypting the actual information. In implementations where the server encrypts the access token 124 and the application identification information together, the verification module 228 must decrypt the combination in order to perform the comparison.

If the application identification information 128 matches the actual information of the application 236, the application 236 itself is authenticated. If the access token 124 was encrypted separately from the application identification information 128, the verification module 228 decrypts (536) the access token. The system service 224 then returns (538) the access token 124 to the application. The application 236 can now use the access token 124 to request protected data 126 from the remote server 300.

FIG. 6 illustrates an exemplary process for using an access token 124 to retrieve protected data 126 from the remote server 300. The application 236 requests (602) a portion of the protected data 126, and the request includes both the access token 124 and the client certificate 122. When the server receives the request, the first step is to match (604) the access token 124 to the access token 124 stored in the database 118. If the access token 124 does not match the access token 124 corresponding to the client certificate (or if there is no match for the client certificate in the database), then the request is denied, and no protected data is returned.

In some implementations, the server 300 performs an additional verification step that requires the requesting application 236 to sign another nonce. In these implementations, the server 300 generates (606) a nonce 706, and stores (608) the nonce 706 with the client certificate 122. The server 300 then requests (610) the application 236 to sign the nonce 706. The application 236 forwards (612) the nonce 706 to the encryption module 226 in the local system service 224. The encryption module 226 encrypts (614) the nonce 706 using the client private key 232. The encryption module 226 then returns (616) the signed (encrypted) nonce 706 to the application 236. The application 236 forwards (618) the signed nonce 706 to the server 300. The authentication module 322 at the server 300 verifies (620) the nonce 706 by decrypting with the client public key 230.

After the verification step, the access limit module 328 at the server 300 applies (622) any applicable access limits 330. In general, an individual client device requests only a small portion 126A of the protected data 126, so the application will receive all the data requested. However, excessive use may reach an access limit 330, in which case no data is returned to the application 236, or only a subset of the requested data is returned. After applying the applicable limits 330, whatever portion 126A of the protected information 126 is allowed is returned (624) to the application.

In some implementations, the additional verification step (606-620) is not performed. In these implementations, once the request is received and the token validated, the limits are applied (622) and the resulting portion 126A is returned (624) to the application.

Figure 7C:
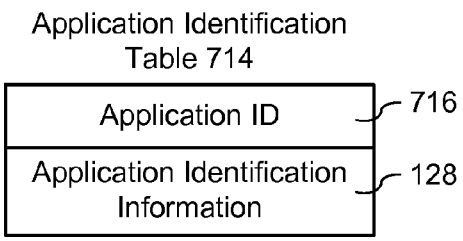
Figure 7B:
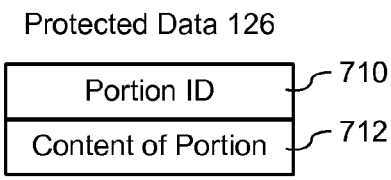

FIGS. 7A-7C are exemplary data structures that store data for the remote server 300 in a database 118. The data structure illustrated in FIG. 7A stores information about client devices. In some implementations, each device is assigned a device ID 702, which may be assigned by the remote server 300 or the authentication module 322 running at the remote server 300. In some implementations, the device ID 702 is received from the client device 200, which may be a MAC address or other unique identifier for the device 200. In some implementations, a device ID 702 is not used because the device is uniquely identified by the client digital certificate 122 stored on the device 200. Implementations use the client certificate 122 both as a unique identifier for the client device 200 as well to access the public key 230 stored in the digital certificate 122. In some implementations, the public key 230 is stored separately from the digital certificate 122, either in addition to or instead of storage as part of the digital certificate 122.

During the authentication process, the nonce generator 324 generates an authentication nonce 704, which is stored with the client device information. The process uses the authentication nonce 704 to verify that the client device 200 has access to encrypting data using the client private key 232. In some implementations, the authentication nonce 704 is deleted (e.g., set to 0) after the authentication process is complete. When the authentication process is complete, the authentication module 322 generates an access token 124, and stores the access token 124 with the other device information. To get access to the protected data 326, the client device 200 provides the access token 124 to the remote server. In some implementations, the client device 200 encrypts the access token 124 with the private key 232 prior to sending it to the remote server 300.

In some implementations, the remote server 300 performs a second validation when a client device 200 requests a portion of the protected data 126. In some of these implementations, the authentication module 322 invokes the nonce generator 324 to generate a request nonce 706, and asks the client device 200 to digitally sign the nonce 706 (i.e., encrypt it with the client private key 232). The request nonce 706 is stored with the other client device data. In some implementations, the data structure for client devices has a single nonce field, which stores either the authentication nonce 704 or the request nonce 706 depending on the circumstances. In some implementations, the request nonce 706 is deleted (e.g., set to 0) when it is no longer in use.

In some implementations, the data structure for client devices includes an authentication status 708, which indicates the stage in the authentication process. In some implementations, the status 708 is stored as a numeric value (e.g., an 8-bit integer), whereas in other implementations, the status 708 is an alphanumeric field (e.g., a fixed length or variable length string). An exemplary set of status values are:

AWAITING AUTHENTICATON-immediately after generating the authentication nonce 704; and TOKEN ISSUED-immediately after the server 300 generates the access token 124.

Some implementations utilize additional status values to provide more detail during the authentication process. Some implementations use additional status values while a client device 200 requests protected information 126. Such status information may be stored in the same status field 708, or an alternative status field (not shown in FIG. 7A).

FIG. 7B illustrates how the protected data 126 is stored in some implementations. In these implementations, the protected data 126 consists of a large number of portions, with each portion identified by a portion ID 710. Stored with each portion ID 710 is the actual content 712 of each portion. When stored in this way, a request from a client device 200 may ask for one or more portion ID's 710. In some implementations, the individual portions 710 are identified by one or more other characteristics, and a request specifies the characteristics of the portions 710 desired rather than the portion ID's 710. For example, a mapping application may use longitude and latitude coordinates, with each portion as a very small grid cell specified by the coordinates. In some implementations, the characteristics of each portion uniquely define each portion, and thus portion ID's are not used.

In some implementations, the remote server 300 operates with a single application 236, in which case storing an application ID 716 is unnecessary. In implementations where a single server 300 provides services for multiple applications 236, the database 118 keeps track of the application identification information 128 for each application 236, typically by associating each application 236 with a unique application ID 716. When one server 300 provides services to multiple distinct applications 236, the application must identify itself to the server. In some implementations, the application 236 sends its application ID 716 with each transmission to the server 300 (e.g., as an HTTP parameter). In some implementations, the application 236 is identified by the URL used by the application 236. One of skill in the art would recognize that there are many ways for an application 236 to identify itself to the server 300.

Figure 8A:
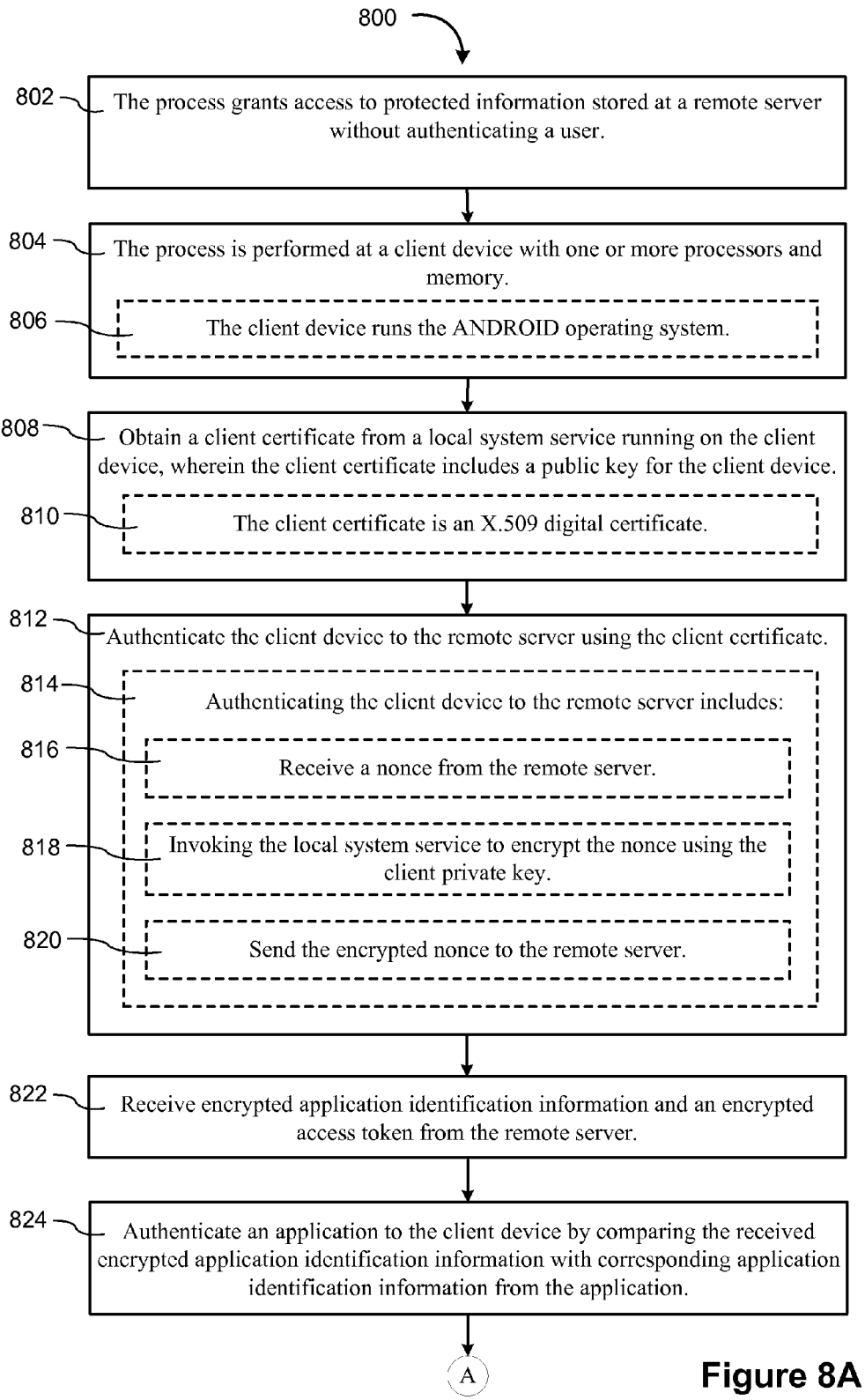
FIGS. 8A and 8B provide an exemplary process flow for retrieving protected information from a remote server in accordance with some implementations.
Figure 8B:
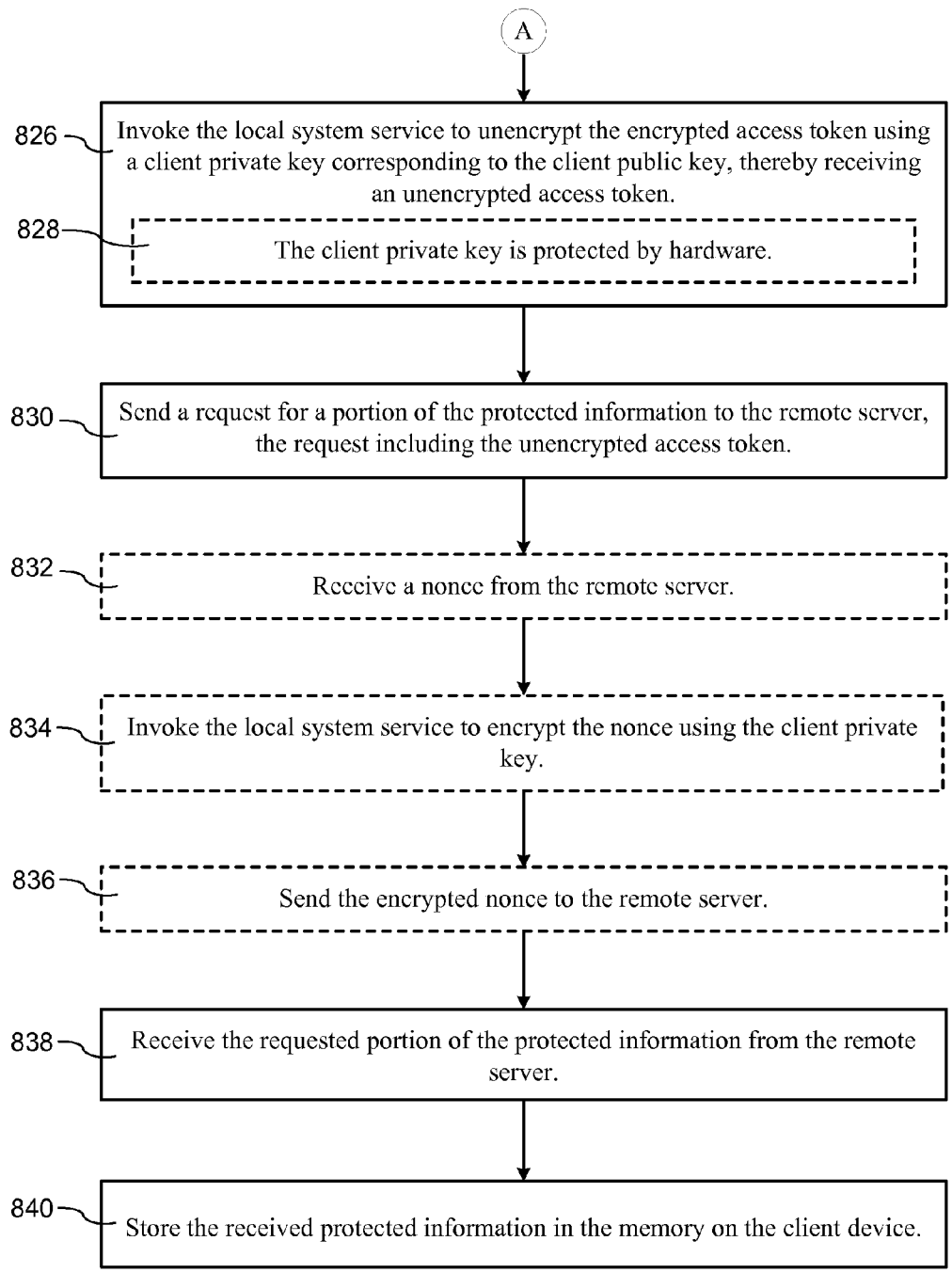

FIGS. 8A-8B illustrate a process flow 800 that begins when a client device 200 needs to retrieve a portion of the protected information 126 from the remote server 300. If the client device 200 has not previously been authenticated, or if the previous access token 124 has been deleted (e.g., by a factory reset), the process begins with authentication. The entire process grants (802) access to protected information 126 stored at a remote server 300 without authenticating a user. The process is performed (804) at a client device 200 with one or more processors 202 and memory 214. In some implementations, the client device 200 runs (806) the ANDROID operating system 220.

The application 236 obtains (808) the client certificate 122 for the device 200 from the local system service 224 running on the client device 200. The client certificate 122 includes (808) the public key 230 for the client device 200. In some implementations, the client certificate 122 is (810) an X.509 digital certificate.

After obtaining (808) the client certificate 122, the client device 200 is authenticated (812) to the remote server 300 using the client certificate. In some implementations, authenticating the client device 200 to the remote server includes (814): receiving (816) a nonce 704 from the remote server 300; invoking (818) the local system service 224 (e.g., the encryption module 226) to encrypt the nonce 704 using the client private key 232; and sending (820) the encrypted nonce 704 to the remote server 300. As used herein, a "nonce" is a pseudo-random number that is generated and used one time.

The application 236 subsequently receives (822) encrypted application identification information 128 and an encrypted access token 124 from the remote server 300. The application 236 is then authenticated (824) to the client device 200 by comparing the received encrypted application identification information 128 with the corresponding application identification from the application 236. In some implementations, the verification module performs the comparison by encrypting the application identification information retrieved from the application 236, and comparing with the application identification information 128 received from the remote server 300. In some implementations, a hash function is applied to the application identification information 128 prior to encrypting (both the information from the server 300 and the information directly retrieved from the application 236). In some implementations, the verification module decrypts the encrypted application identification information 128 received from the remote server 300, and compares that unencrypted data to the application identification information retrieved directly from the application. In some implementations, the application identification information 128 and the access token 124 are encrypted together, whereas in other implementations, they are encrypted separately. Some implementations apply a hash function to either the application identification information 128 or the access token 124, or to both.

After the application 236 is authenticated to the client device 200, the application 236 invokes (826) the local system service (e.g., encryption module 226) to unencrypt the encrypted access token 124 using the client private key 232. The private key 232 corresponds (826) to the client public key 230. The application thereby receives (826) the unencrypted access token 124.

The client private key 232 is stored in the system space 216 on the client device 200. The private key 232 cannot be accessed by user applications 236. Instead, the local system service provides a well-defined interface with methods that user applications 236 can invoke. In some implementations, the private key 232 is protected (828) by hardware (e.g., using a hardware encryption key). In other implementations, the private key is protected by software. One of skill in the art would readily understand that there are many ways to protect data on a client device 200 from unauthorized access using hardware protection, software protection, or a combination of both.

Using the access token, the application 236 can request data from the server 300. The application 236 sends (830) a request for a portion of the protected information 126 to the remote server 300. The request includes (830) the unencrypted access token.

In some implementations, there is a second authentication process that occurs for each request. In some implementations, the second authentication process uses a nonce 706, similar to the original authentication process. The application 236 receives (832) the nonce 706 from the remote server 300. The application 236 then invokes (834) the location system service 224 (e.g., the encryption module 226) to encrypt the nonce 706 using the client private key 232. The application 236 then sends (836) the encrypted nonce to the remote server 300.

The application receives (838) the requested portion of the protected information 126 from the remote server 300, then stores (840) the received protected information 126 in the memory 214 in the client device 200.

The application token 124 received by the application 236 is generally not deleted (except when there is a hard reset), so the application 236 can continue to retrieve data using the same access token 124. In this case, the request begins at operation 830 in the process flow depicted in FIGS. 8A-8B.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. For example, one of ordinary skill in the art would recognize that a has function could be applied to the nonces 704 and 706.

In some alternative implementations, the operating system 220 on the client device 200 maintains a list of applications, and only those applications can receive access tokens 124. In some of these implementations, the server 300 does not maintain application identification information, because the authentication of applications is performed by the operating system 220 on the client device 200. In another variation, the server 300 need not store the entire client certificate 122. In fact, the server may just store the public key 230 in the certificate 122, as well as a unique identifier of the certificate, such as a serial number. In some implementations, the client device 200 sends not only the client certificate 122, but also the entire certificate chain, which includes all of the certificate authorities involved in the signing of the certificate. These additional authorities can facilitate the verification of trust by the server 300. In other implementations, the nonces 704 and 706 are combined with other information (and potentially run through a hash function) in order to provide greater security.

The implementations were chosen and described in order to best explain the principles of the invention and its practical applications, to thereby enable others skilled in the art to best utilize the invention and various implementations with various modifications as are suited to the particular use contemplated.

What is claimed is:

1. A method of granting access to protected information stored at a remote server without authenticating a user, performed at a client device with one or more hardware processors and memory, comprising:
   obtaining a client certificate from a local system service running on the client device, wherein the client certificate includes a public key for the client device;
   authenticating the client device to the remote server using the client certificate without requiring user input during the authentication, wherein the client device is identified by a client certificate;
   receiving, upon authentication of the client device, encrypted application identification information and an encrypted access token from the remote server;
   authenticating an application to the authenticated client device by comparing the received encrypted application identification information with corresponding application identification information from the application;
   invoking the local system service to unencrypt the encrypted access token using a client private key corresponding to the client public key, thereby receiving an unencrypted access token, which is provided to the application for requesting the protected information from the remote server;

sending a request for a portion of the protected information to the remote server, the request including the unencrypted access token;

receiving the requested portion of the protected information from the remote server upon validating the token by the remote server; and storing the received protected information in the memory on the client device.

2. The method of claim 1, wherein authenticating the client device to the remote server comprises:

receiving a nonce from the remote server;

invoking the local system service to encrypt the nonce using the client private key; and sending the encrypted nonce to the remote server.

3. The method of claim 1, further comprising after sending the request for a portion of the protected information to the remote server:

receiving a nonce from the remote server;

invoking the local system service to encrypt the nonce using the client private key; and sending the encrypted nonce to the remote server.

4. The method of claim 1, wherein the client certificate is an X.509 digital certificate.

5. The method of claim 1, wherein the client private key is protected by hardware.

6. The method of claim 1, wherein the client device runs the ANDROID operating system.

7. A client computer system for granting access to protected information stored at a remote server without authenticating a user, comprising:

memory; one or more hardware processors; and one or more programs stored in the memory and configured for execution by the one or more hardware processors, the one or more programs including:

instructions for obtaining a client certificate from a local system service running on the client device, wherein the client certificate includes a public key for the client device;

instructions for authenticating the client device to the remote server using the client certificate without requiring user input during the authentication, wherein the client device is identified by a client certificate;

instructions for receiving, upon authentication of the client device, encrypted application identification information and an encrypted access token from the remote server;

instructions for authenticating an application to the client device by comparing the received encrypted application identification information with corresponding application identification information from the application;

instructions for invoking the local system service to unencrypt the encrypted access token using a client private key corresponding to the client public key, thereby receiving an unencrypted access token, which is provided to the application for requesting the protected information from the remote server;

instructions for sending a request for a portion of the protected information to the remote server, the request including the unencrypted access token;

instructions for receiving the requested portion of the protected information from the remote server upon validating the token by the remote server; and instructions for storing the received protected information in the memory on the client device.

8. The client computer system of claim 7, wherein the instructions for authenticating the client device to the remote server include:

instructions for receiving a nonce from the remote server;

instructions for invoking the local system service to encrypt the nonce using the client private key; and instructions for sending the encrypted nonce to the remote server.

9. The client computer system of claim 7, wherein the one or more programs further include instructions that execute after sending the request for a portion of the protected information to the remote server, the one or more programs including:

instructions for receiving a nonce from the remote server;

instructions for invoking the local system service to encrypt the nonce using the client private key; and instructions for sending the encrypted nonce to the remote server.

10. The client computer system of claim 7, wherein the client certificate is an X.509 digital certificate.

11. The client computer system of claim 7, wherein the client private key is protected by hardware.

12. The client computer system of claim 7, wherein the client device runs the ANDROID operating system.

13. A non-transitory computer readable storage medium storing one or more programs to be executed by a client computer system, the one or more programs comprising:

instructions for obtaining a client certificate from a local system service running on the client device, wherein the client certificate includes a public key for the client device;

instructions for authenticating the client device to the remote server using the client certificate without requiring user input during the authentication, wherein the client device is identified by a client certificate;

instructions for receiving, upon authentication of the client device, encrypted application identification information and an encrypted access token from the remote server;

instructions for authenticating an application to the client device by comparing the received encrypted application identification information with corresponding application identification information from the application;

instructions for invoking the local system service to unencrypt the encrypted access token using a client private key corresponding to the client public key, thereby receiving an unencrypted access token, which is provided to the application for requesting the protected information from the remote server;

instructions for sending a request for a portion of the protected information to the remote server, the request including the unencrypted access token;

instructions for receiving the requested portion of the protected information from the remote server upon validating the token by the remote server; and instructions for storing the received protected information in the memory on the client device.

14. The non-transitory computer readable storage medium of claim 13, wherein the instructions for authenticating the client device to the remote server include:

instructions for receiving a nonce from the remote server;

instructions for invoking the local system service to encrypt the nonce using the client private key; and instructions for sending the encrypted nonce to the remote server.

15. The non-transitory computer readable storage medium of claim 13, wherein the one or more programs further include instructions that execute after sending the request for a portion of the protected information to the remote server, the one or more programs including:
- instructions for receiving a nonce from the remote server;
- instructions for invoking the local system service to encrypt the nonce using the client private key; and
- instructions for sending the encrypted nonce to the remote server.

16. The non-transitory computer readable storage medium of claim 13, wherein the client certificate is an X.509 digital certificate.

17. The non-transitory computer readable storage medium of claim 13, wherein the client private key is protected by hardware.

18. The non-transitory computer readable storage medium of claim 13, wherein the client device runs the ANDROID operating system.

* * * * *